(12) United States Patent
Banker et al.

(10) Patent No.: US 9,802,618 B2
(45) Date of Patent: Oct. 31, 2017

(54) SYSTEMS AND METHODS FOR IMPROVING MANUAL TRANSMISSION SHIFTING

(71) Applicant: Ford Global Technologies, LLC, Dearborn, MI (US)

(72) Inventors: Adam Nathan Banker, Canton, MI (US); Hamid-Reza Ossareh, Ann Arbor, MI (US); Baitao Xiao, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 14/716,456

(22) Filed: May 19, 2015

(65) Prior Publication Data

US 2016/0339920 A1 Nov. 24, 2016

(51) Int. Cl.
  *B60W 30/19* (2012.01)
  *F16H 61/04* (2006.01)
  *F16H 63/50* (2006.01)
  *B60W 10/06* (2006.01)
  *B60W 10/30* (2006.01)

(52) U.S. Cl.
  CPC ............ *B60W 30/19* (2013.01); *B60W 10/06* (2013.01); *B60W 10/30* (2013.01); *F16H 63/50* (2013.01); *B60W 2540/10* (2013.01); *B60W 2540/14* (2013.01); *B60W 2710/305* (2013.01)

(58) Field of Classification Search
  CPC .......................... B60W 30/19; F16H 61/0403
  See application file for complete search history.

(56) References Cited

U.S. PATENT DOCUMENTS

| | | | | |
|---|---|---|---|---|
| 4,266,447 A * | 5/1981 | Heess | ................... | B60W 10/06 477/101 |
| 5,679,093 A * | 10/1997 | Desautels | ............. | B60W 10/06 477/109 |
| 5,979,257 A | 11/1999 | Lawrie | | |
| 6,319,168 B1 | 11/2001 | Morris et al. | | |
| 8,340,877 B2 | 12/2012 | Murayama et al. | | |
| 8,515,633 B2 * | 8/2013 | G V | ...................... | B60W 30/19 701/102 |
| 2009/0137364 A1 * | 5/2009 | Honma | ................... | F16D 48/06 477/175 |
| 2011/0045948 A1 * | 2/2011 | Doering | ................ | B60W 10/06 477/33 |
| 2013/0005531 A1 * | 1/2013 | Sung | ....................... | F16H 63/40 477/84 |

* cited by examiner

*Primary Examiner* — Tisha Lewis
(74) *Attorney, Agent, or Firm* — Julia Voutyras; McCoy Russell LLP

(57) ABSTRACT

Systems and methods for improving shifting of a manual transmission coupled to an engine are presented. In one example, a load provided to the engine is increased in response to a transmission gear upshift so that engine speed may be quickly decreased to synchronize with transmission input speed, thereby allowing quicker manual transmission gear shifts.

20 Claims, 4 Drawing Sheets

SYSTEMS AND METHODS FOR IMPROVING MANUAL TRANSMISSION SHIFTING

FIELD

The present description relates to systems and methods for improving shifting of a manual transmission coupled to an engine. The methods and system may be particularly useful for vehicles that may be expected to be shifted quickly by a driver.

BACKGROUND AND SUMMARY

A manual transmission may be shifted when a driver depresses a clutch pedal and adjusts a position of a manual shift lever. During an upshift from a lower (e.g., first gear) to a higher (e.g., second gear) gear, a driver opens a clutch by depressing a clutch pedal. The driver also changes a position of a shift lever to release the gear being exited and enter the next higher gear. For a smooth shift, the driver waits until the engine speed has decreased to a speed that is near the transmission input shaft speed before closing the manually operated clutch. If the driver releases the clutch pedal and closes the clutch sooner than is desired, a driveline torque disturbance may be experienced by the driver. However, if the driver closes the clutch when engine speed is near transmission input shaft speed, the shift may be smooth and the driver may experience a smooth progression in driveline torque. Engine torque may be increased in response to a change in a requested or desired engine torque. Nevertheless, it may be difficult for a driver to judge when engine speed is near transmission input shaft speed because displays of transmission input shaft speed are uncommon. Consequently, drivers may experience driveline torque disturbances from time to time, especially during conditions where the driver is attempting to facilitate a quick shift.

The inventors herein have recognized the above-mentioned disadvantages and have developed a driveline operating method, comprising: receiving sensor input to a controller; judging a shift of a manual transmission is in progress via the controller in response to the sensor input; and increasing a load applied to an engine via the controller based on the judgement.

By decreasing engine speed via applying a load to the engine responsive to a transmission gear upshift, it may be possible to provide the technical result of reducing a time for manually shifting a manual transmission. In particular, engine speed may be reduced quickly to transmission input shaft speed by applying a load to the engine responsive to an indication of an upshift. Lowering engine speed to transmission input shaft speed sooner may allow a driver to release a clutch sooner without experiencing an undesirable driveline torque disturbance. Further, in some examples, the manual upshift may be anticipated so that actions may be taken to before the actual upshift is in progress to overcome lag time of some types of load actuators.

The present description may provide several advantages. In particular, the approach may reduce manual transmission gear upshift times. Further, the approach may reduce driveline torque disturbances. Further still, the approach may be provided even with some actuators that may not respond as fast as is desired.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
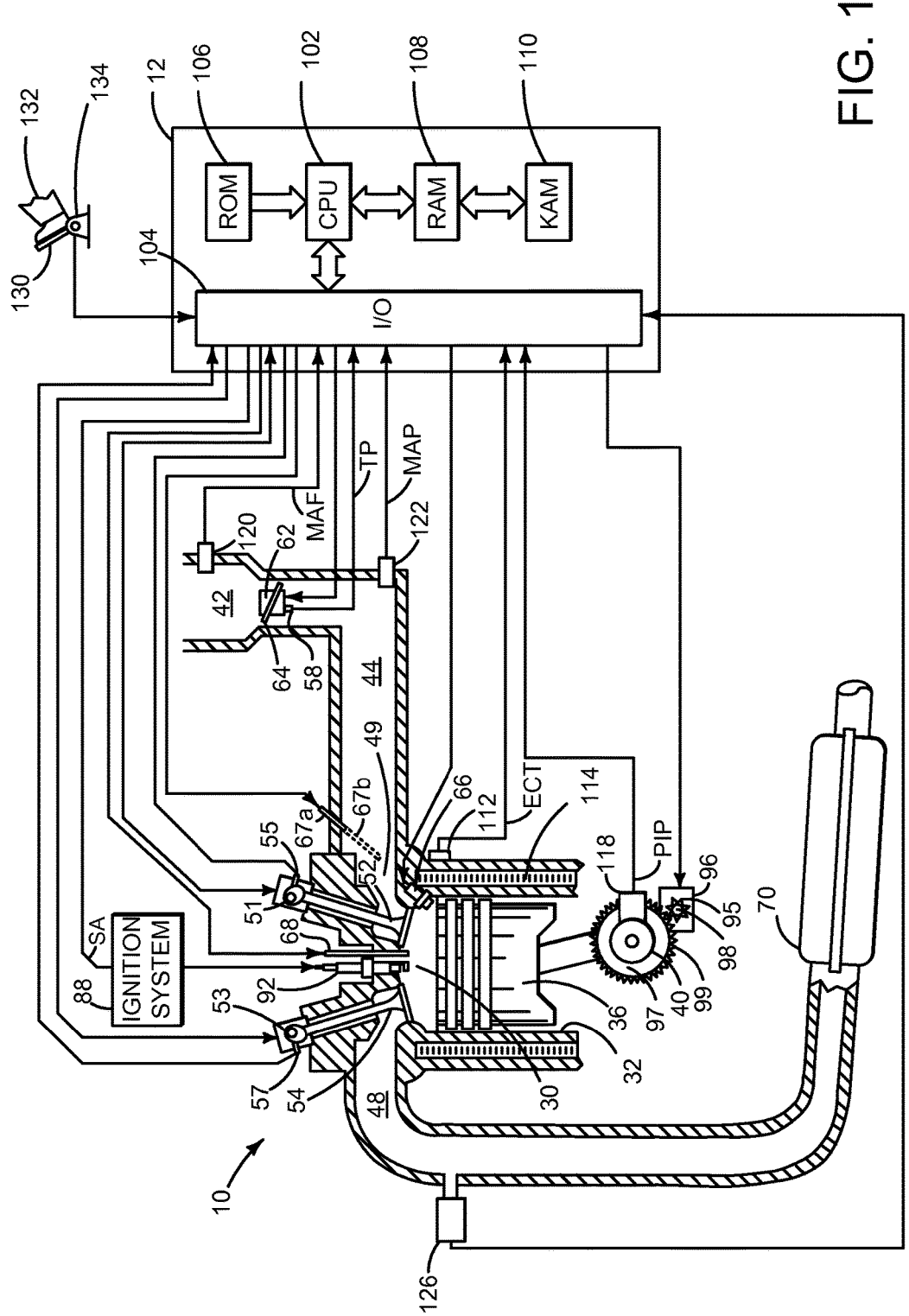
FIG. 1 is a schematic diagram of an engine.
Figure 2:
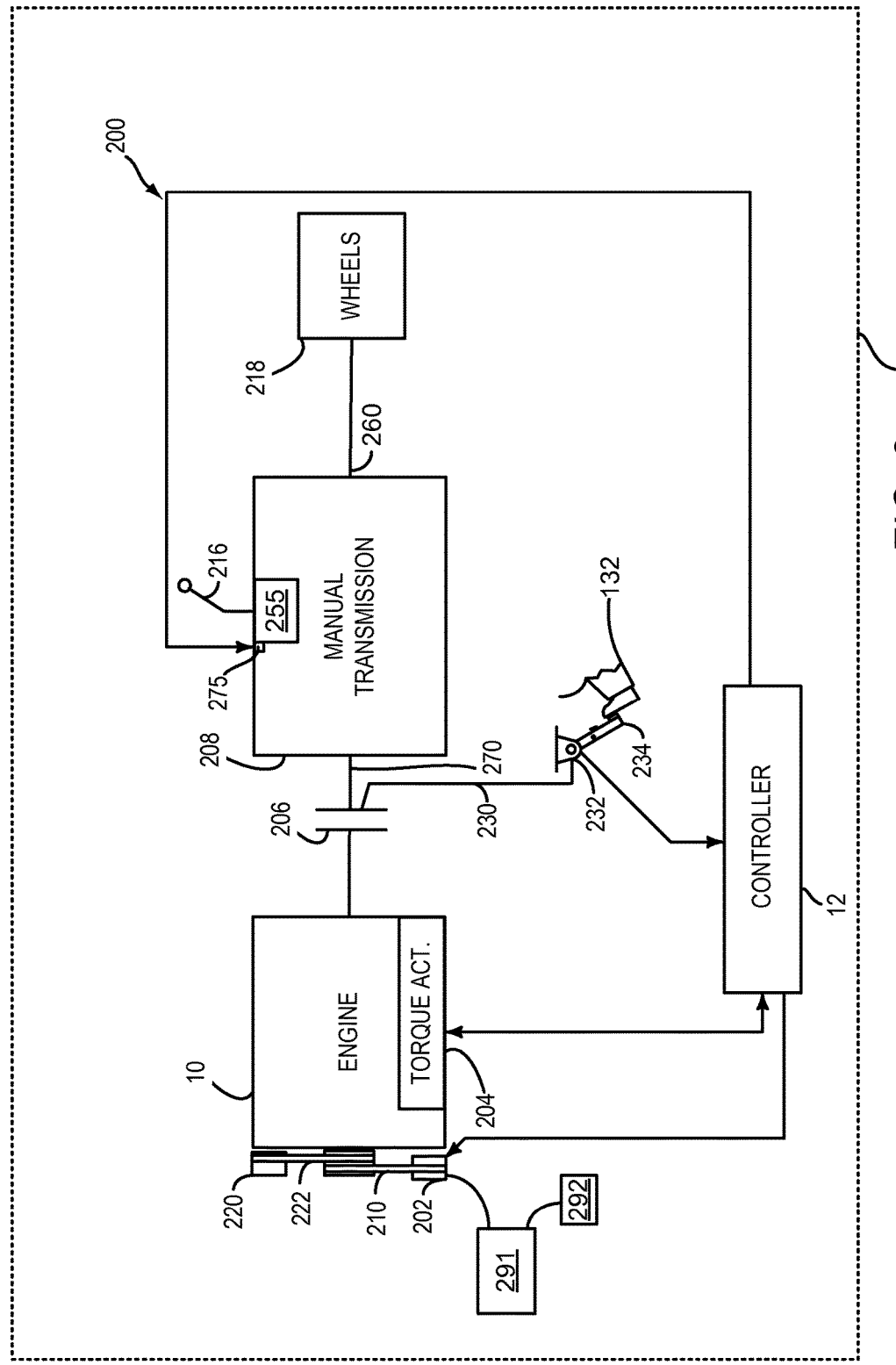
FIG. 2 is shows an example vehicle driveline configuration.

The present description is related to operating a vehicle that includes an internal combustion engine and a manual transmission. The engine may be configured as shown in FIG. 1. The engine may be mechanically coupled to other vehicle components to form a driveline as shown in FIG. 2. The vehicle may operate according to the simulated operating sequences shown in FIG. 4. The method described in FIG. 4 may be included in the systems of FIGS. 1 and 2 to provide the sequence of FIG. 3.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Liquid fuel injector 66 is shown positioned to inject fuel directly into cylinder 30, which is known to those skilled in the art as direct injection. Alternatively, liquid fuel may be injected to an intake port, which is known to those skilled in the art as port injection. Fuel injector 66 deliver liquid fuel in proportion to pulse widths from controller 12. Fuel is delivered to fuel injector 66 by a fuel system (not shown) including a fuel tank, fuel pump, and fuel rail (not shown).

Intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

A driver 132 inputs a driver demand torque to controller 12 via accelerator pedal 130 and accelerator pedal position sensor 134. The driver demand torque may be a function of vehicle speed and accelerator pedal position.

Controller 12 is shown in FIG. 1 as a conventional microcomputer including: microprocessor unit 102, input/output ports 104, non-transient memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. Driveline 200 may be powered by engine 10 in vehicle 290. Engine 10 may be started with an engine starting system shown in FIG. 1. Further, engine 10 may generate or adjust torque via torque actuator 204, such as a fuel injector, cam, throttle, etc. Engine 10 may provide torque to alternator 202 via belt 210 to provide electrical power to electrical devices. Thus, alternator 202 selectively applies a negative torque to engine 10. Further, electrical charge is supplied by alternator 202 to electric energy storage device (e.g., battery) 291. Electric energy storage device supplies charge to ancillary electrical devices 292 (e.g., window defroster, radio, etc). Device 220 also selectively applies a negative torque to engine 10 via belt 222. Device 220 may be an air conditioner compressor, vacuum pump, or other torque consuming device.

An engine output torque may be transmitted to manually operated clutch 206. Manually operated clutch 206 is operated via manually operated clutch pedal 234 and linkage 230. Clutch position sensor 232 provides a position of clutch pedal 234 to controller 12. Manually operated clutch 206 may be selectively operated by driver 132 depressing and/or releasing manually operated clutch 206. Manually operated clutch 206 is opened when clutch pedal 234 is depressed. Manually operated clutch 206 is closed when clutch pedal 234 is released. Input shaft 270 mechanically couples manually operated clutch 206 to manually operated transmission 208.

Manually operated transmission 208 includes gears (e.g., gears 1-6) 255. The gears 255 are fixed ratio gears that provide different ratios between transmission input shaft 270 and output shaft 260. Gears 255 may be manually engaged and disengaged by opening manually operated clutch 206 and moving manual gear selector 216 via driver 132. Closing clutch 206 transfers power from engine 10 to wheels 218 when one of gears 255 is engaged via manual gear selector 216. Gear positions are reported to controller 12 via gear position sensors 275. Output shaft 260 links manual transmission 208 to wheels 218. In some examples, an axle and gears may be positioned between manual transmission 208 and wheels 216.

Controller 12 may be configured to receive inputs from engine 10, as shown in more detail in FIG. 1, and accordingly control a torque output of the engine and/or operation of the alternator 202 and device 222. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines.

Thus, the method of FIGS. 1 and 2 provides for a vehicle system, comprising: an engine; a manual transmission coupled to the engine, the manual transmission including a manually operated clutch; and a controller including non-transitory instructions for increasing a load applied to the engine in response to a gear upshift of the manual transmission. The vehicle system further comprises additional instructions for increasing an engine air amount in response to anticipating the gear upshift. The vehicle system further comprises an alternator, and additional instructions for increasing the load via the alternator. The vehicle system further comprises an air conditioner compressor, and additional instructions for increasing the load via the air conditioning compressor. The vehicle system includes where the manual transmission includes a manually operated clutch. The vehicle system includes where the manual transmission includes a manual shift lever.

Figure 3:
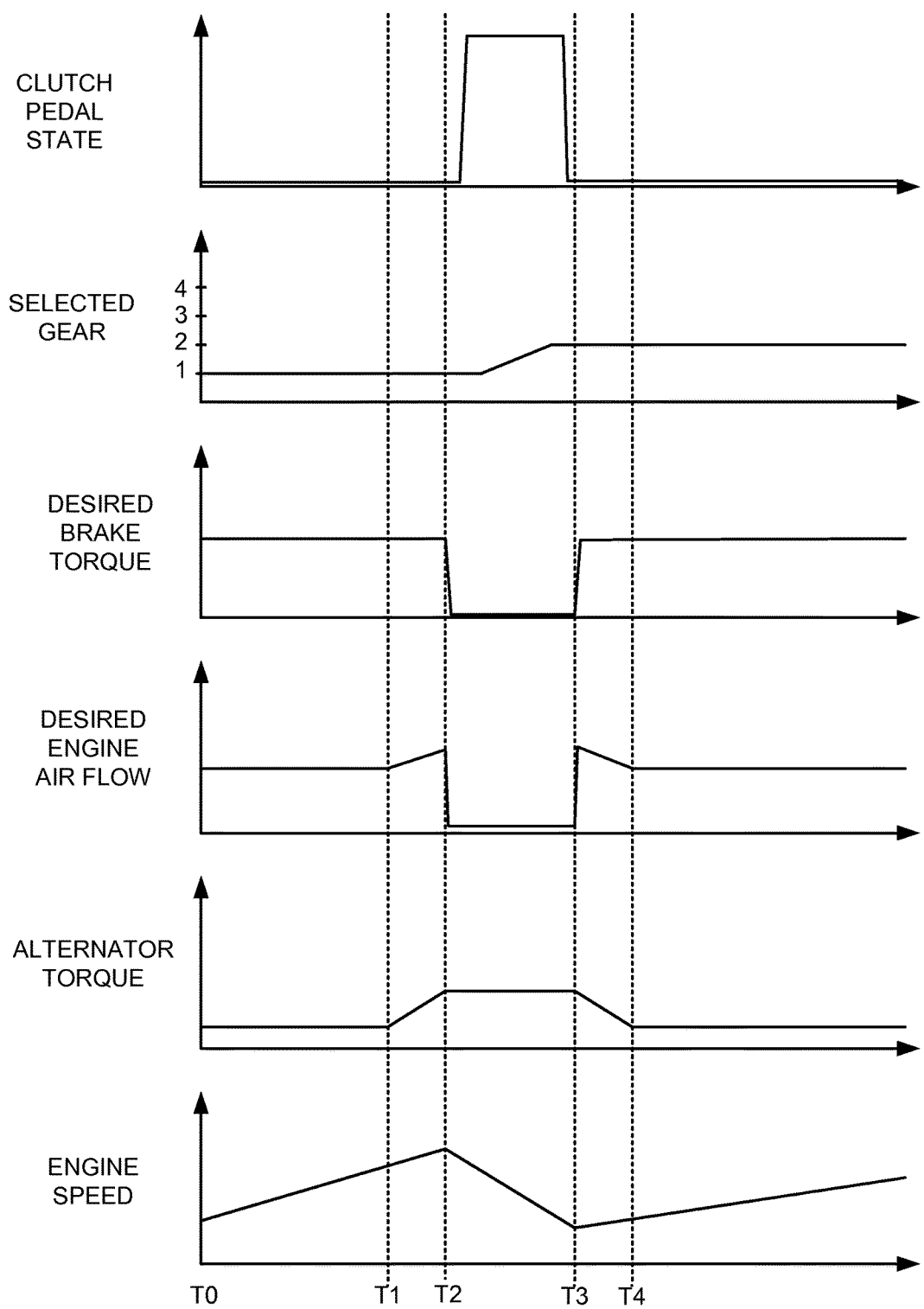
FIG. 3 shows an example vehicle operating sequence.

Referring now to FIG. 3, a simulated example vehicle operating sequence for the system of FIGS. 1 and 2 is shown. The operating sequence may be provided via executable instructions that provide the method of FIG. 4 in concert with sensors and actuators shown in FIGS. 1 and 2. Vertical lines T0-T4 indicate times of interest during the sequence.

The first plot from the top of FIG. 3 is a plot of clutch pedal state versus time. The vertical axis represents manual clutch pedal state. The manual clutch pedal is not applied (e.g., released) and the manual clutch is closed when the trace is at a lower level near the horizontal axis. The manual clutch pedal is applied (e.g., depressed) and the manual cutch is open when the trace is at a higher level near the vertical axis arrow. The horizontal axis represents time and time increases from the left side of the plot to the right side of the plot.

The second plot from the top of FIG. 3 is a plot of selected gear versus time. The vertical axis represents selected gear. The selected gears are identified at different levels along the vertical axis. The gears are selected via the manual gear lever. The horizontal axis represents time and time increases from the left side of the plot to the right side of the plot.

The third plot from the top of FIG. 3 is a plot of desired engine brake torque versus time. The vertical axis represents desired engine brake torque. The desired engine brake torque increases in the direction of the vertical axis arrow. The horizontal axis represents time and time increases from the left side of the plot to the right side of the plot.

The fourth plot from the top of FIG. 3 is a plot of desired engine air flow versus time. The vertical axis represents desired engine air flow. The desired engine air flow increases in the direction of the vertical axis arrow. The horizontal axis represents time and time increases from the left side of the plot to the right side of the plot.

The fifth plot from the top of FIG. 3 is a plot of desired alternator torque versus time. The vertical axis represents alternator torque. The alternator torque increases in the direction of the vertical axis arrow. The alternator torque is a negative torque when applied to the engine. The horizontal axis represents time and time increases from the left side of the plot to the right side of the plot.

The sixth plot from the top of FIG. 3 is a plot of engine speed versus time. The vertical axis represents engine speed. The engine speed increases in the direction of the vertical axis arrow. The horizontal axis represents time and time increases from the left side of the plot to the right side of the plot.

At time T0, the vehicle is in first gear and the clutch pedal is not depressed. The desired engine brake torque and engine air flow are at a middle level and the alternator torque is at a lower level applying a lower negative torque to the engine. The engine speed is increasing.

At time T1, vehicle speed enters a speed range where it may be expected that a driver will manually shift transmission gears. The speed range may be based on or a function of presently selected gear and desired engine brake torque, vehicle speed, and/or accelerator pedal position. In some examples, an upshift may be forecast instead of a downshift based on accelerator pedal or driver demand torque trajectory. For example, if driver demand torque or accelerator pedal position is increasing, or constant, as engine speed is increasing and as the engine speed enters a range where gear shifting is expected, it may be determined that the driver is expected to upshift (e.g., shift to a higher gear). The alternator load and desired engine air flow may be increased in response to the expected transmission manual gear shift. The alternator load is increased so that when the driver releases the accelerator pedal (not shown), engine speed will be reduced at a faster rate. The engine air flow is increased a corresponding amount to the alternator load so that the driver does not notice the increase in alternator load. For example, if the alternator torque applies 20 N-m negative torque to the engine, engine torque is increased by 20 N-m. The engine torque is increased via increasing the engine air flow and fuel flow. The engine is kept operating and combusting a stoichiometric air-fuel mixture as the engine torque increases. The engine speed continues to increase and the desired engine brake torque continues at a same level.

Between time T1 and time T2, the alternator torque and desired engine air flow are ramped to greater values. The clutch pedal is not applied nor is the accelerator pedal released (not shown). The engine speed continues to increase.

At time T2, the driver releases the accelerator pedal to initiate an upshift. The desired engine brake torque decreases in response to the driver releasing the accelerator pedal. Further, the desired engine air flow is reduced in response to the decreased desired engine brake torque. The alternator torque is held at a constant level. However, in some examples where engine speed is within a threshold speed of transmission input shaft speed, the amount of torque applied to the engine via the alternator or other torque consumer may be decreased so that engine speed does not rapidly decrease below transmission input shaft speed. The engine speed is reduced in response to the decrease in desired engine brake torque. The selected gear remains in first gear and the clutch pedal is not applied.

Between time T2 and time T3, the clutch pedal is applied and the selected gear changes from first gear to second gear by the driver manually changing the gear selector position. The engine speed decreases due to a lower engine air amount and the alternator load being applied to the engine. The clutch pedal is released near time T3 to match engine speed to transmission input shaft speed.

At time T3, the driver applies the accelerator pedal (not shown) and the desired engine brake torque increases in response to the applied accelerator pedal. The desired engine air flow increases in response to the desired engine brake torque and in response to the negative torque applied to the engine via the alternator. By increasing the engine air flow, actual engine brake torque may follow desired engine brake torque even though negative torque is applied to the engine via the alternator. The engine speed begins to increase in response to the increase in desired engine brake torque.

Between time T3 and time T4, the alternator torque and desired engine air flow are ramped to lower values. The alternator torque is decreased so that battery charge is not increased higher than is desired. The clutch pedal is not applied nor is the accelerator pedal released (not shown). The engine speed continues to increase.

In this way, engine operating conditions may be adjusted in anticipation of a manual transmission gear shift. In particular, an alternator load may be increased and engine torque production may be increased until the driver releases the accelerator pedal so that when the accelerator pedal is released, engine speed is reduced faster than compared to if only engine air flow is reduced. Reducing engine speed faster during a shift may allow a driver to engage a new gear and close a manually operated clutch sooner without causing an undesirable driveline torque disturbance.

Figure 4:
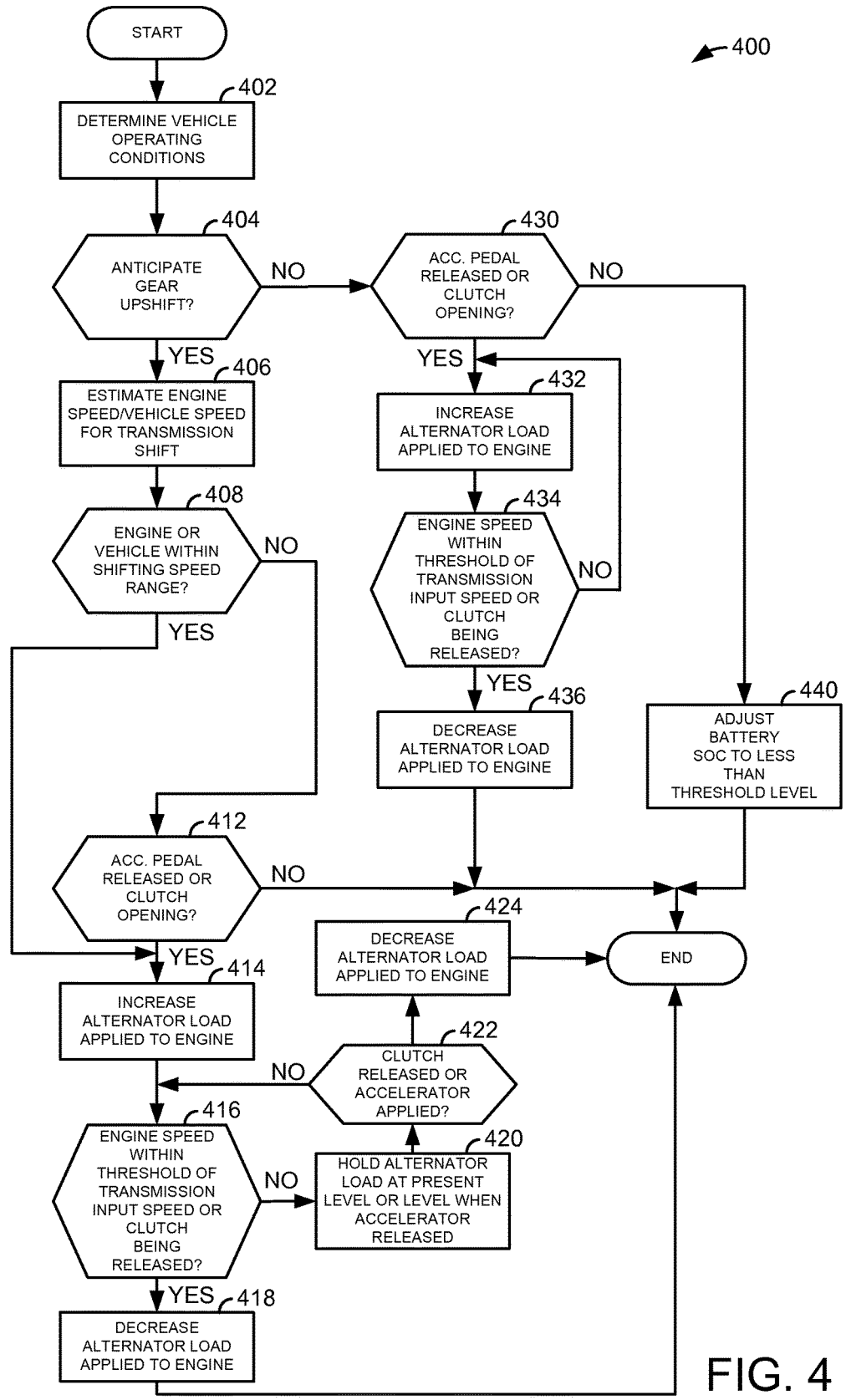
FIG. 4 shows an example method for operating a vehicle.

Referring now to FIG. 4, a method for operating a vehicle driveline is shown. The method of FIG. 4 may be at least partially implemented as executable instructions stored in controller memory. The method of FIG. 4 may cooperate with and be a part of the system of FIGS. 1 and 2. Further, the method of FIG. 4 along with the system of FIGS. 1 and 2 may provide the operating sequence shown in FIG. 3.

At 402, method 400 determines vehicle operating conditions. Vehicle operating conditions may be determined via data input to a controller from vehicle sensors and actuators. Vehicle operating conditions may include but are not limited to engine speed, vehicle speed, presently selected gear, accelerator pedal position, clutch pedal position, and alternator or torque consuming device load applied to the engine. Method 400 proceeds to 404 after vehicle operating conditions are determined.

At 404, method 400 judges if manual transmission gear upshifting is to be anticipated or forecast before the actual gear upshift occurs. In one example, method 400 may judge that manual transmission gear upshifting is to be anticipated when the manual transmission is in selected gears (e.g., gears 1 and 2, but not gears 3 and 4). In other examples, method 400 may judge that manual transmission gear upshifting is to be anticipated in response to a rate of accelerator pedal application being greater than a threshold (e.g., greater than X mm/second). If method 400 judges that manual transmission gear shifting is to be anticipated, the answer is yes and method 400 proceeds to 406. Otherwise, the answer is no and method 400 proceeds to 430.

At 406, method 400 estimates an engine speed or vehicle speed range where the driver is expected to upshift the manual transmission. In one example, the engine speed or vehicle speed where the driver is expected to upshift is a function of accelerator pedal position, presently selected gear, and engine speed where the engine produces peak engine torque. Further, in some examples, the engine speed or vehicle speed where the driver is expected to shift may be further based on rate of increase in accelerator pedal position. For example, the driver may be expected to shift the manual transmission at an engine speed range between 300 RPM less than an engine speed where the engine produces maximum torque and 100 RPM greater than the speed the engine produces maximum torque when the accelerator pedal is applied to greater than 50 percent of full scale when the vehicle is operating in first gear. The engine or vehicle speed estimates may be empirically determined and stored to memory in tables and or functions. The engine speed range and/or vehicle speed ranges are determined via indexing the functions and tables via engine speed or vehicle speed and present selected gear. Method 400 proceeds to 408 after the engine speed or vehicle speed range of expected shifting is determined.

At 408, method 400 judges if engine speed or vehicle speed is within the range determined at 406. Further, in some examples, method 400 judges if select conditions are present to determine whether or not the shift is expected to be an upshift. Method 400 may judge that the impending shift is expected to be an upshift when driver demand torque or accelerator pedal position is increasing, or constant, as engine speed is increasing and as the engine speed enters a range where gear shifting is expected. If engine speed or vehicle speed is within the expected shifting speed range and the shift is expected to be an upshift, the answer is yes and method 400 proceeds to 414 where a load applied to the engine via the alternator is increased. Otherwise, the answer is no and method 400 proceeds to 412. In this way, the load applied by the alternator to the engine may be applied before the driver opens the clutch or releases the throttle so that a slow reacting alternator may increase engine torque at a same time as a gear shift or before the gear shift.

At 414, method 400 increases the load the alternator applies to the engine. The alternator load may be increased via increasing an amount of current supplied to an alternator field coil. Further, in some examples, the load applied by the alternator may be based on the gear that is presently engaged. For example, if first gear is engaged, a first load may be applied to the engine via the alternator. If a second gear is engaged, a second load, different than the first load, may be applied to the engine via the alternator. Additionally, the desired engine air flow and fuel flow are increased by the same amount alternator torque is increased, but in an opposite direction. For example, a negative torque provided to the engine is increased to a more negative torque (e.g., −20 N-m) and engine torque is increased by a more positive torque (e.g., +20 N-m) via opening an engine throttle. In this way, the change in alternator torque applied to the engine is compensated via the change in engine torque so that the driver may not notice a torque change. The alternator torque may be estimated based on alternator field current and alternator speed. Method 400 proceeds to 416 after the alternator load that is applied to the engine is increased.

At 416, method 400 judges if engine speed is within a threshold speed of transmission input shaft speed or if the transmission clutch is being released by the driver or if the driver is applying the accelerator pedal. If so, the answer is yes and method 400 proceeds to 418. Otherwise, the answer is no and method 400 proceeds to 420.

At 418, method 400 decreases the load the alternator applies to the engine. The alternator load may be reduced to a value that provides a desired voltage output from the alternator to maintain battery charge. Method 400 proceeds to exit after alternator load applied to the engine is reduced.

In some examples, method 400 may include an additional step whereby battery state of charge (SOC) is maintained or reduced to a value less than a threshold value before method 400 is exited. Because alternator load is increased during the manual gear shift, method 400 may allow vehicle accessories to partially drain the vehicle battery so that additional charge may be supplied to the battery during a subsequent manual gear shift. Thus, in between shifts, battery state of charge may be reduced by controller 12 commanding ancillary electrical devices to increase electrical charge consumption from the battery so that the battery is in a state to accept charge during a subsequent upshift.

At 412, method 400 judges if the accelerator pedal has been or is being released or if the clutch is opening or the clutch pedal is being depressed. Method 400 makes this judgement so that if the driver shifts transmission gears outside of the engine or vehicle speed range described at 408, the alternator load applied to the engine may be increased to reduce engine speed during the shift. If method 400 judges that the accelerator pedal has been or is being released or if the clutch is opening or the clutch pedal is being depressed, the answer is yes and method 400 proceeds to 414. Otherwise, the answer is no and method 400 proceeds to exit.

At 420, method 400 holds the alternator at a load or torque that is presently applied to the engine or at a load that the alternator applied to the engine when the accelerator pedal was released. By holding the alternator load, an expected engine deceleration rate may be provided. In still other examples, the alternator load may be increased to a predetermined load. Method 400 proceeds to 422 after the alternator load is applied to the engine.

At 422, method 400 judges if the manual clutch is being released or is released or if the accelerator pedal is being applied. Alternatively, method 400 may judge if a new gear has been selected and engaged via the manual gear selector. Such conditions may provide an indication that the manual shift is ending and the engine speed will soon be matched to the transmission input speed by closing the manual clutch. If method 400 judges that one or more of the conditions is present, the answer is yes and method 400 proceeds to 424. Otherwise, the answer is no and method 400 proceeds to 416.

At 424, method 400 decreases the alternator load applied to the engine. The alternator load may be reduced via lowering a current supplied to an alternator field coil. Method 400 proceeds to exit after the alternator load is decreased.

At 430, method 400 judges if the accelerator pedal has been or is being released or if the clutch is opening or the clutch pedal is being depressed. Method 400 may use these conditions as a basis for determining if shift is present. If method 400 judges that the accelerator pedal has been or is being released or if the clutch is opening or the clutch pedal is being depressed, the answer is yes and method 400 proceeds to 432. Otherwise, the answer is no and method 400 proceeds to 440. Further, in some examples, method 400 may also require conditions for an upshift be present before proceeding to 432.

At 432, method 400 increases an alternator load applied to the engine. The alternator load is increased to slow the engine to transmission input shaft speed sooner so that a smooth shift may be provided by the driver. Method 400 proceeds to 434 after the alternator load applied to the engine is increased (e.g., a larger negative torque is applied to the engine via the alternator).

At 434, method 400 judges if engine speed is within a threshold speed of transmission input shaft speed or if the transmission clutch is being released by the driver or if the driver is applying the accelerator pedal. If so, the answer is yes and method 400 proceeds to 436. Otherwise, the answer is no and method 400 returns to 432. If method 400 returns to 432 the alternator may hold the alternator at a load or torque that is presently applied to the engine or at a load that the alternator applied to the engine when the accelerator pedal was released. By holding the alternator load, an expected engine deceleration rate may be provided. In still other examples, the alternator load may be increased to a predetermined load.

At 436, method 400 decreases the alternator load applied to the engine. The alternator load may be reduced via lowering a current supplied to an alternator field coil. Method 400 proceeds to exit after the alternator load is decreased.

At 440, method 400 adjusts battery SOC to a level less than a threshold level. Battery SOC may be reduced via increasing charge supplied to electrical devices such as window defrosters. Battery SOC is reduced so that battery charge may be increased during a subsequent transmission gear shifting event. Otherwise, if SOC were at a higher level, alternator load applied to the engine may have to be reduced. Method 400 proceeds to exit after battery SOC is reduced to less than a threshold SOC.

It should be mentioned that although method 400 describes an alternator applying load to the engine, load may be provided to the engine via an air conditioning compressor, vacuum pump, or other engine accessory load. Further, loads from other accessory devices such as air conditioning compressors may be applied to the engine in conjunction or contemporaneously with applying alternator load to the engine during manual transmission gear shifting to reduce engine speed during a manual gear shift.

Thus, the method of FIG. 4 provides for a driveline operating method, comprising: receiving sensor input to a controller; judging a shift of a manual transmission is in progress via the controller in response to the sensor input; and increasing a load applied to an engine via the controller based on the judgement. The method includes where the load is an alternator load. The method includes where the alternator load is adjusted responsive to the gear being exited and the gear being entered. The method includes where the load is an air conditioner clutch load. The method includes where the air conditioner clutch load is adjusted responsive to the gear being exited and the gear being entered. The method includes where the load is a vacuum pump. The method includes where the shift of the manual transmission is judged to be in progress is based on a position of an accelerator pedal. The method includes where the shift of the manual transmission is judged to be in progress is based on a position of a clutch pedal.

The method of FIG. 4 also provides for a driveline operating method, comprising: receiving sensor input to a controller; anticipating a shift of a manual transmission via the controller in response to the sensor input; and increasing a load applied to an engine via the controller based on the anticipation. The method includes where the shift is anticipated based on vehicle speed and present gear engaged. The method includes where the shift is anticipated based on accelerator pedal position and present gear engaged. The method includes where the manual transmission is shifted via adjusting a position of a shift lever and opening a clutch via a clutch pedal. The method further comprises increasing engine torque in response to anticipating the shift. The method further comprises adjusting a position of a throttle to increase engine torque.

As will be appreciated by one of ordinary skill in the art, method described in FIG. 4 may represent one or more of any number of processing strategies such as event-driven, interrupt-driven, multi-tasking, multi-threading, and the like. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method, comprising:
   receiving sensor input to a controller;
   anticipating a shift of a manual transmission via the controller in response to the sensor input; and
   increasing air flow to an engine and a load applied to the engine via the controller based on the anticipation.

2. The method of claim 1, where the load is an alternator load and further comprising:
   decreasing the load applied to the engine based on the anticipation in response to an accelerator pedal being applied.

3. The method of claim 2, where the alternator load is adjusted responsive to a gear being exited and the gear being entered.

4. The method of claim 1, where the load is an air conditioner clutch load and further comprising:
   adjusting battery state of charge to less than a threshold for a subsequent gear shift event in response to an accelerator pedal being released or a manual clutch being closed.

5. The method of claim 4, where the air conditioner clutch load is adjusted responsive to a gear being exited and the gear being entered.

6. The method of claim 1, where the load is a vacuum pump.

7. The method of claim 6, where the shift of the manual transmission is judged to be in progress is based on a position of an accelerator pedal.

8. The method of claim 6, where the shift of the manual transmission is judged to be in progress is based on a position of a clutch pedal.

9. A driveline operating method, comprising:
   receiving sensor input to a controller;
   anticipating a shift of a manual transmission via the controller in response to the sensor input;
   increasing a load applied to an engine via the controller based on the anticipation; and
   decreasing the load applied to the engine based on the anticipation in response to an accelerator pedal being applied.

10. The method of claim 9, where the shift is anticipated based on vehicle speed and present gear engaged and further comprising:
    increasing air flow to the engine in response to the anticipation.

11. The method of claim 9, where the shift is anticipated based on accelerator pedal position and present gear engaged and further comprising:
    adjusting battery state of charge to less than a threshold for a subsequent gear shift event in response to the accelerator pedal being released or a manual clutch being closed.

12. The method of claim 9, where the manual transmission is shifted via adjusting a position of a shift lever and opening a clutch via a clutch pedal.

13. The method of claim 9, further comprising increasing engine torque in response to anticipating the shift.

14. The method of claim 13, further comprising adjusting a position of a throttle to increase engine torque in response to anticipating the shift.

15. A vehicle system, comprising:
    an engine;
    a manual transmission coupled to the engine, the manual transmission including a manually operated clutch; and
    a controller including executable instructions stored in non-transitory memory for increasing a load applied to the engine in response to a gear upshift of the manual transmission and decreasing the load applied to the engine for the gear upshift in response to an accelerator pedal being applied.

16. The vehicle system of claim 15, further comprising additional instructions for increasing an engine air amount in response to anticipating the gear upshift.

17. The vehicle system of claim 15, further comprising an alternator, and additional instructions for increasing the load via the alternator.

18. The vehicle system of claim 15, further comprising an air conditioner compressor, and additional instructions for increasing the load via the air conditioner compressor.

19. The vehicle system of claim 15, further comprising:
    additional instructions to adjust battery state of charge to less than a threshold for a subsequent gear shift event in response to the accelerator pedal being released or the manually operated clutch being released.

20. The vehicle system of claim 15, where the manual transmission includes a manual shift lever.

* * * * *